US012571740B2

(12) United States Patent　　(10) Patent No.:　US 12,571,740 B2
Lee et al.　　　　　　　　　　　(45) Date of Patent:　　Mar. 10, 2026

(54) UTILIZATION OF IMAGE ANALYTICS TO DETECT ABNORMALITIES ON FAN BLADES OF GAS TURBINE ENGINES

(71) Applicant: RAYTHEON TECHNOLOGIES CORPORATION, Farmington, CT (US)

(72) Inventors: Jeremiah C. Lee, Coventry, CT (US); Paul Attridge, Colchester, CT (US); Zaffir A. Chaudhry, South Glastonbury, CT (US); Scott Goyette, Moosup, CT (US); Gregory S. Hagen, Glastonbury, CT (US); David L. Lincoln, Cromwell, CT (US); Kin Gwn Lore, Belmont, MA (US)

(73) Assignee: RTX Corporation, Farmington, CT (US)

( * ) Notice: Subject to any disclaimer, the term of this patent is extended or adjusted under 35 U.S.C. 154(b) by 441 days.

(21) Appl. No.: 18/105,299

(22) Filed: Feb. 3, 2023

(65) Prior Publication Data

US 2024/0264092 A1　　Aug. 8, 2024

(51) Int. Cl.
　*G01N 21/95*　　　(2006.01)
　*G01N 21/88*　　　(2006.01)
　*G06F 18/2135*　　(2023.01)
　*G06T 7/00*　　　 (2017.01)
　*G01N 21/17*　　　(2006.01)

(52) U.S. Cl.
　CPC ..... *G01N 21/9515* (2013.01); *G01N 21/8851* (2013.01); *G06F 18/2135* (2023.01);
　　　　　　(Continued)

(58) Field of Classification Search
　CPC ........... G01N 21/9515; G01N 21/8851; G01N 2021/1765; G01N 2021/8861;
　　　　　　(Continued)

(56) References Cited

U.S. PATENT DOCUMENTS 8,528,317 B2　　9/2013　Gerez et al.
9,476,798 B2　　10/2016　Pandey
　　　　　　(Continued)

FOREIGN PATENT DOCUMENTS

CN　　110792563 A　*　2/2020　............. G01H 17/00
CN　　111178392　　　5/2020

OTHER PUBLICATIONS

European Search Report for European Patent Application No. 24155616.6 dated Oct. 30, 2024.
　　　　　　(Continued)

*Primary Examiner* — Tung S Lau
(74) *Attorney, Agent, or Firm* — Carlson, Gaskey & Olds, P.C.

(57)　　　　　ABSTRACT

Methods of inspecting fan blades of a gas turbine engine for abnormalities are disclosed. One method utilizes a neural network to determine whether a photographic image of at least one fan blade depicts an abnormality of the at least one fan blade. Another method uses a dimensional reduction technique on one or more first photographic images that depict at least one first fan blade to obtain basis vectors, utilizes the basis vectors to obtain a reconstructed version of a second photographic image that depicts at least one second fan blade, and determines whether the at least one second fan blade includes an abnormality based on a difference between the second photographic image and the reconstructed version of the second photographic image. Another method determines whether a fan blade includes an abnormality based on contrast differences between adjacent areas of an image.

6 Claims, 7 Drawing Sheets

(52) U.S. Cl.
CPC .... *G06T 7/0004* (2013.01); *G01N 2021/1765*
(2013.01); *G01N 2021/8861* (2013.01); *G01N*
*2021/8887* (2013.01); *G06T 2207/20081*
(2013.01); *G06T 2207/20084* (2013.01)

(58) Field of Classification Search
CPC ........ G01N 2021/8887; G06F 18/2135; G06T
7/0004; G06T 2207/20081; G06T
2207/20084; G06T 2207/30164
See application file for complete search history.

(56) References Cited

U.S. PATENT DOCUMENTS

| | | | |
|---|---|---|---|
| 10,504,220 B2 | 12/2019 | Lim et al. | |
| 10,691,985 B2 | 6/2020 | Lim et al. | |
| 10,914,191 B2 | 2/2021 | Finn et al. | |
| 2006/0023961 A1* | 2/2006 | Suh ................... | G01N 27/9046 |
| | | | 382/240 |
| 2009/0066939 A1 | 3/2009 | Venkatachalam et al. | |
| 2009/0097729 A1 | 4/2009 | Venkatachalam et al. | |
| 2012/0078097 A1* | 3/2012 | Wang ................... | A61B 8/0883 |
| | | | 600/437 |
| 2019/0338666 A1 | 11/2019 | Finn et al. | |
| 2022/0215522 A1 | 7/2022 | Vorobieva et al. | |

OTHER PUBLICATIONS

Aust et al., "Automated defect detection and decision-support in gad turbine blade inspection", Aerospace, vol. 8, No. 2, p. 30, Jan. 26, 2021.

* cited by examiner

<u>FIG.4</u>

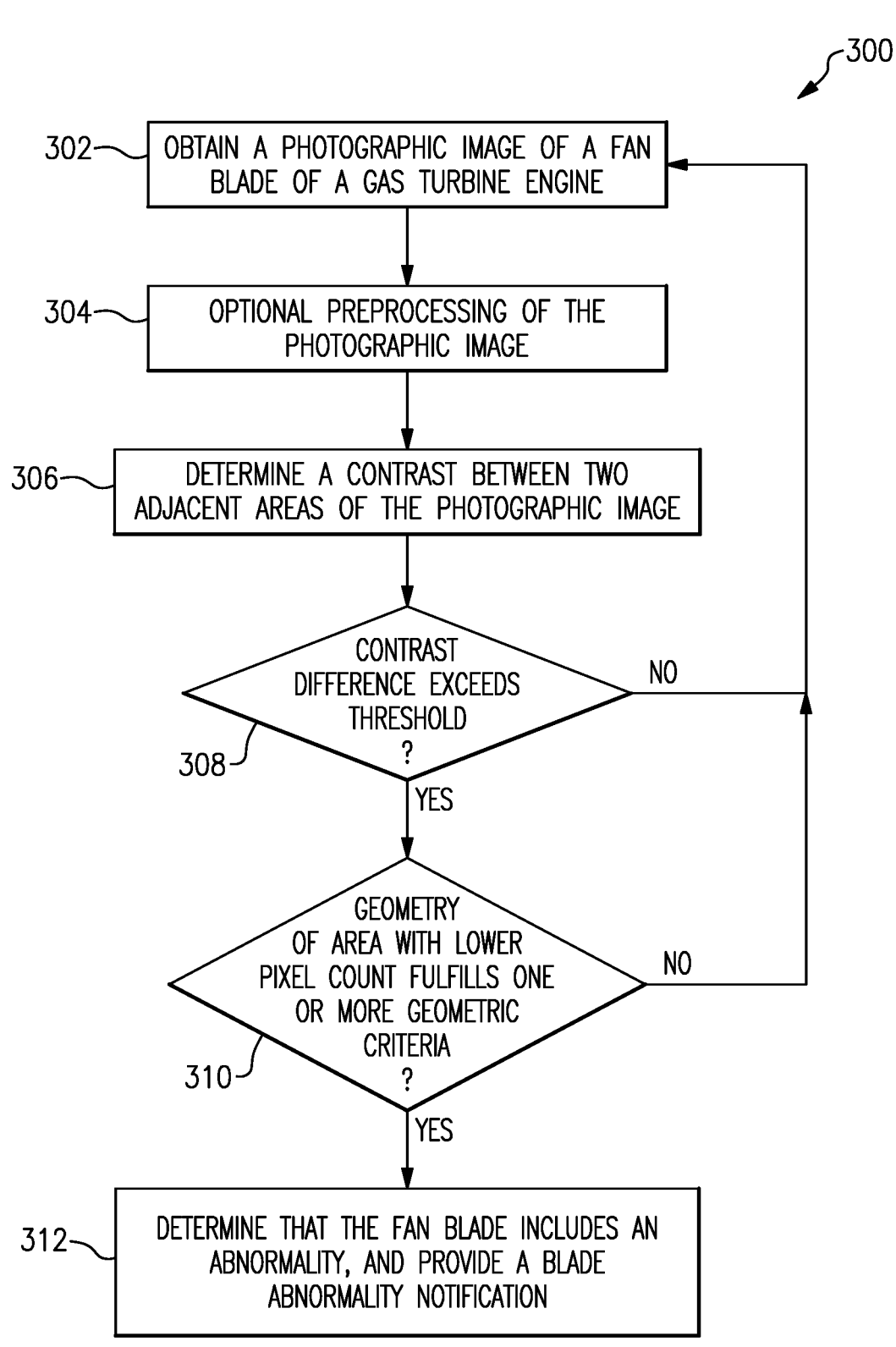

300

302 — OBTAIN A PHOTOGRAPHIC IMAGE OF A FAN BLADE OF A GAS TURBINE ENGINE

304 — OPTIONAL PREPROCESSING OF THE PHOTOGRAPHIC IMAGE

306 — DETERMINE A CONTRAST BETWEEN TWO ADJACENT AREAS OF THE PHOTOGRAPHIC IMAGE

308 — CONTRAST DIFFERENCE EXCEEDS THRESHOLD ?

NO

YES

310 — GEOMETRY OF AREA WITH LOWER PIXEL COUNT FULFILLS ONE OR MORE GEOMETRIC CRITERIA ?

NO

YES

312 — DETERMINE THAT THE FAN BLADE INCLUDES AN ABNORMALITY, AND PROVIDE A BLADE ABNORMALITY NOTIFICATION

FIG.7

UTILIZATION OF IMAGE ANALYTICS TO DETECT ABNORMALITIES ON FAN BLADES OF GAS TURBINE ENGINES

BACKGROUND

This application relates to detecting abnormalities in fan blades of a gas turbine engine, and more particularly to using image analytics techniques to detect abnormalities in fan blades of a gas turbine engine.

It is known to manually inspect fan blades of a gas turbine engine for wear to determine if the fan blades should be replaced or serviced. It is also known to compare fan blade images to blueprints and/or computer model renderings of the fan blades (e.g., CAD models or models reconstructed from fan blade images). However such inspections can typically only happen when a gas turbine engine is not operating and sometimes, the engine has been removed from the aircraft. Also, accounting for variations in camera angles, camera settings, lighting conditions, engine vibration and general noise in images with human inspection makes such methods unreliable and cumbersome to implement.

SUMMARY

A method of inspecting fan blades of a gas turbine engine for abnormalities according to an example embodiment of the present disclosure includes training a neural network using a repository of first photographic images of first fan blades of one or more first gas turbine engines, where the first photographic images depict one or more blade abnormalities; recording a second photographic image of at least one second fan blade of a second gas turbine engine; utilizing the neural network to determine whether the second photographic image depicts an abnormality of the at least one second fan blade; and based on a determination that the second photographic image depicts an abnormality, providing a blade abnormality notification for the at least one second fan blade.

In a further embodiment of the foregoing embodiment, the method also includes modifying portions of at least one of the first photographic images by adding blurring to the portions. The training is performed using an augmented repository of the first photographic images that includes the modified portions.

In a further embodiment of any of the foregoing embodiments, the method includes modifying portions of at least one of the first photographic images by using at least one of the following techniques: scaling, cropping, rotating, gamma correction, and contrast adjustment. The training is performed using an augmented repository of the first photographic images that includes the modified portions.

In a further embodiment of any of the foregoing embodiments, the second photographic image includes blurring that depicts rotation of the at least one second fan blade, and at least one of the first photographic images includes blurring that depicts rotation of the one or more first fan blades.

In a further embodiment of any of the foregoing embodiments, the neural network is a region-based convolutional neural network (RCNN) that includes an autoencoder, and the training is unsupervised training.

In a further embodiment of any of the foregoing embodiments, the training is performed without utilizing any images of blueprints or computer model renderings of the first fan blades.

A method of inspecting fan blades of a gas turbine engine for abnormalities according to an example embodiment of the present disclosure includes obtaining a set of one or more first photographic images that depict at least one first fan blade of one or more first gas turbine engines. The set of one or more first photographic images has initial dimensions corresponding to attributes of pixels of the one or more first photographic images. The method also includes utilizing a dimensional reduction technique on the set of one or more first photographic images to obtain a set of basis vectors for representing the set of first photographic images in a reduced dimensional space that is reduced with respect to the initial dimensions; obtaining a second photographic image that is not part of the set and that depicts at least one second fan blade of a second gas turbine; utilizing the set of basis vectors to obtain a reconstructed version of the second photographic image that reconstructs the second photographic image in the reduced dimensional space; and based on a difference between the second photographic image and the reconstructed version of the second photographic image exceeding a predefined difference threshold, determining that the at least one second fan blade of the second gas turbine includes an abnormality, and providing a blade abnormality notification.

In a further embodiment of the foregoing embodiment, the method also includes, prior to utilizing a dimensional reduction technique to obtain the set of basis vectors: dividing at least one of the one or more first photographic images in the set into a plurality of patches that represent areas of the one of more first images. Utilizing the dimensional reduction technique on the set of one or more first photographic images includes utilizing the dimensional reduction technique on the plurality of patches, and the basis vectors correspond to features common to all of the patches from the one or more first photographic images.

In a further embodiment of any of the foregoing embodiments, the method also includes modifying portions of at least one of the one or more first photographic images by using one or more of the following techniques: scaling, cropping, rotating, gamma correction, and contrast adjustment, and utilizing the dimensional reduction technique on the set of one or more first images is performed on an augmented set of the first photographic images that includes the modified portions.

In a further embodiment of any of the foregoing embodiments, the method also includes modifying portions of at least one of the one or more first photographic images by adding blurring to the portions, and utilizing a dimensional reduction technique on the set of one or more first images is performed on an augmented set of the first photographic images that includes the modified portions.

In a further embodiment of any of the foregoing embodiments, the method also includes modifying portions of at least one of the one or more first photographic images by modifying a brightness of the portions to simulate lighting conditions that differ from those of the at least one of the one or more first photographic images, and utilizing the dimensional reduction technique on the set of one or more first images is performed on an augmented set of the first photographic images that includes the modified portions.

In a further embodiment of any of the foregoing embodiments, none of the one or more first photographic images includes the abnormality.

In a further embodiment of any of the foregoing embodiments, the dimensional reduction technique is Principal Component Analysis (PCA).

A method of inspecting a fan blade of a gas turbine engine for abnormalities according to an example embodiment of the present disclosure includes obtaining a photographic image of a fan blade of a gas turbine engine; determining contrast differences between adjacent areas of the fan blade in the photographic image; and based on the contrast difference between two adjacent areas of the image exceeding a predefined contrast threshold, and further based on a geometry of whichever of the two adjacent areas has a lower pixel count fulfilling one or more geometric criteria, determining that the fan blade includes an abnormality, and providing a blade abnormality notification for the fan blade.

In a further embodiment of the foregoing embodiment, the one or more geometric criteria includes a minimum width that must be exhibited by said whichever of the two adjacent areas has a lower pixel count in order to represent a particular type of abnormality.

In a further embodiment of any of the foregoing embodiments, the one or more geometric criteria includes a minimum area that must be included in said whichever of the two adjacent areas has a lower pixel count in order to represent a particular type of abnormality.

In a further embodiment of any of the foregoing embodiments, the one or more geometric criteria includes a minimum number of pixels that must be included in said whichever of the two adjacent areas has a lower pixel count in order to represent a particular type of abnormality.

In a further embodiment of any of the foregoing embodiments, the one or more geometric criteria includes a shape criterion describing a geometry of a shape representing a particular type of abnormality.

In a further embodiment of any of the foregoing embodiments, the one or more geometric criteria includes a boundary criterion describing a boundary representing a particular type of abnormality.

In a further embodiment of any of the foregoing embodiments, the boundary criterion includes a requirement that a boundary of said whichever of the two adjacent areas has a lower pixel be contiguous in order to represent a particular type of abnormality.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 7 is a flowchart of another example method of inspecting fan blades of a gas turbine engine for abnormalities.

DETAILED DESCRIPTION

Figure 1:
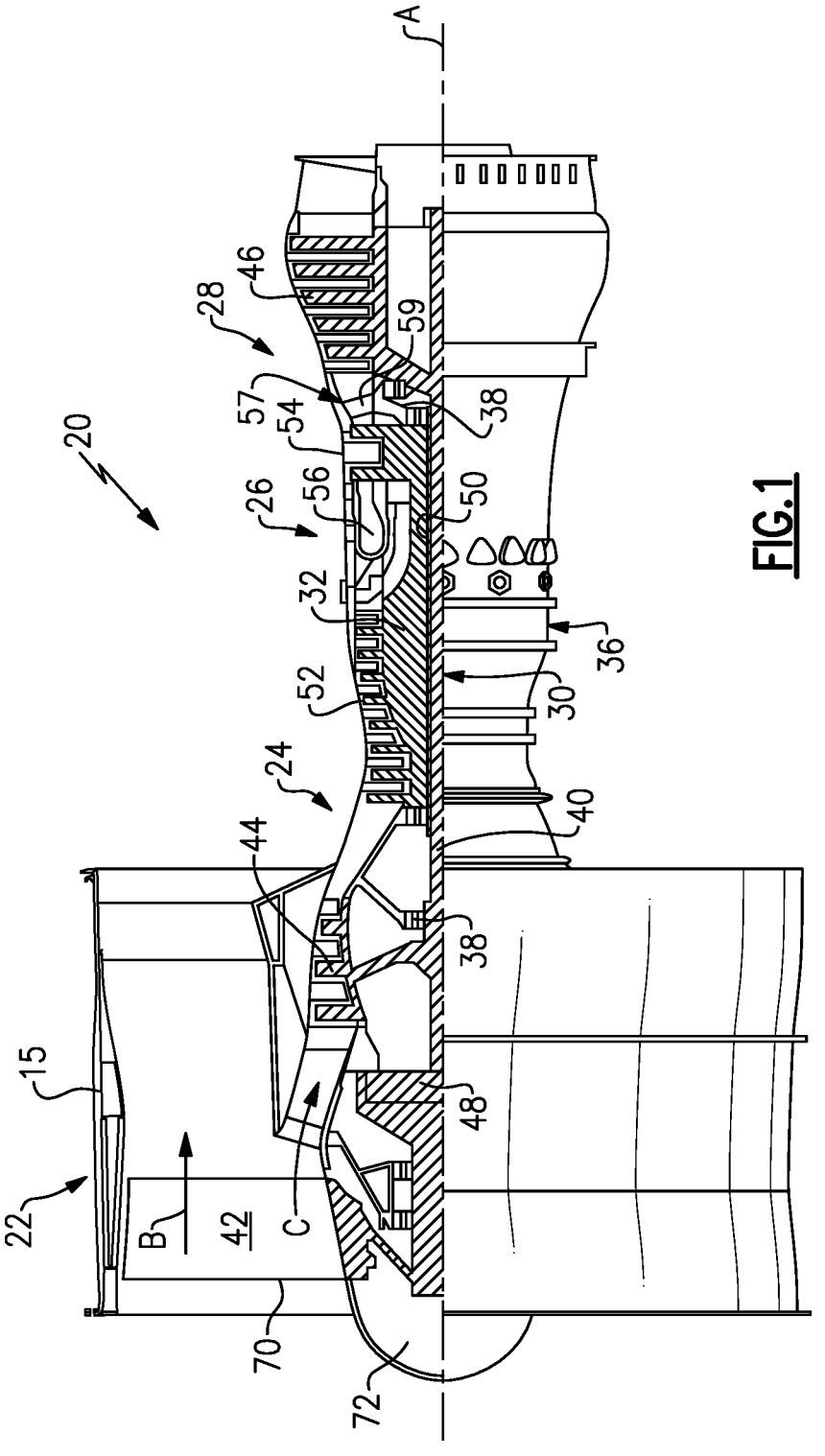
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
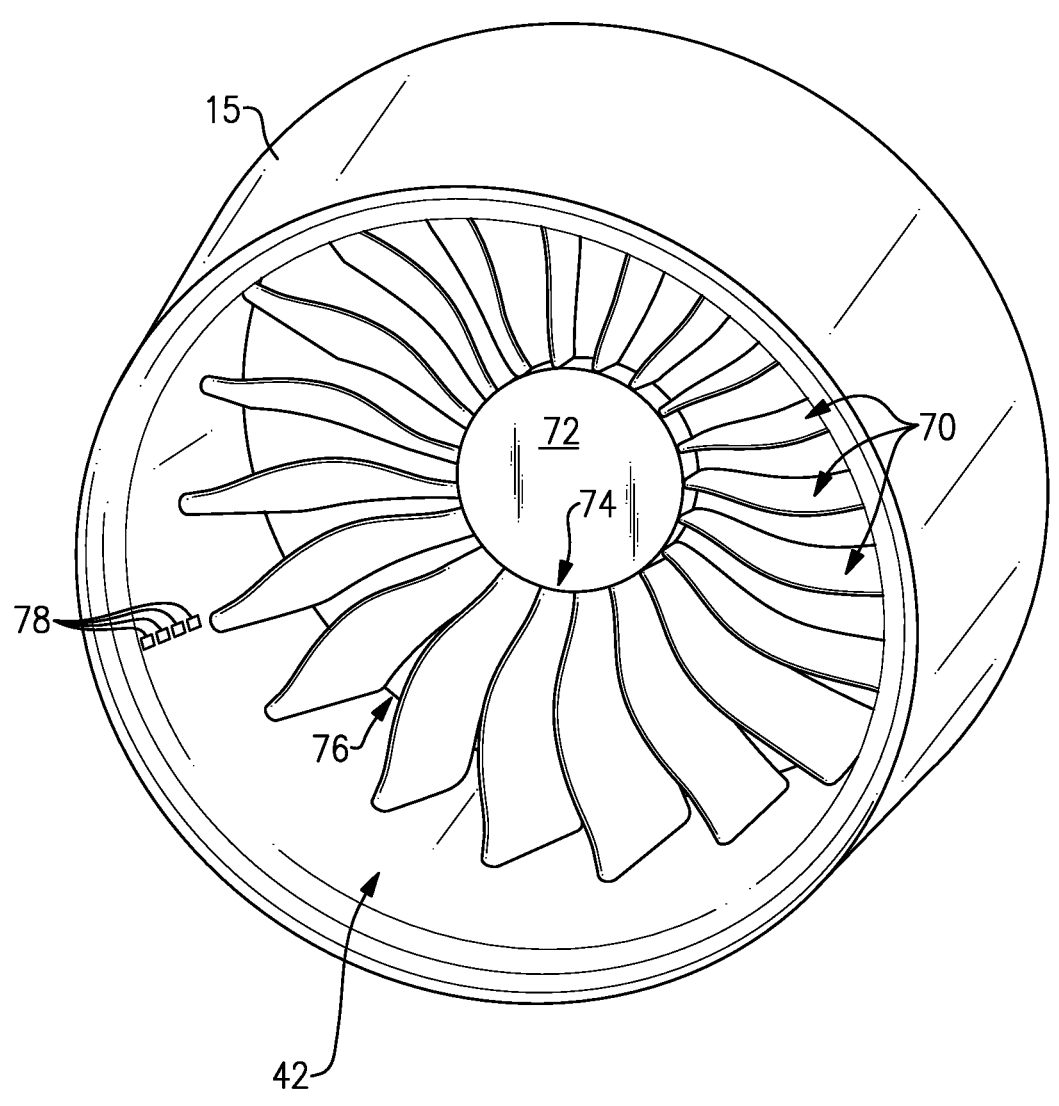
FIG. 2 is a schematic view of a nacelle and fan of FIG. 1.

FIG. 2 is a schematic view of the nacelle 15 and fan 42 of FIG. 1, where the nacelle 15 has been shortened for illustrative purposes. As shown, the fan 42 includes a plurality of fan blades 70 that extend radially outward from a hub 72, and each fan blade 70 extends radially outward from a root 74 to a tip 76. A plurality of cameras 78 are situated within the nacelle 15. Each camera 78 is configured to record photographic images of the fan blades 70. As used herein, a "photographic" image refers to a digital photograph, and does not include non-photograph images, such as CAD model renderings or blueprints of a blade. In one or more embodiments, individual image frames from multiple ones of the cameras 78 are stitched together to form a photographic image.

Figure 3:
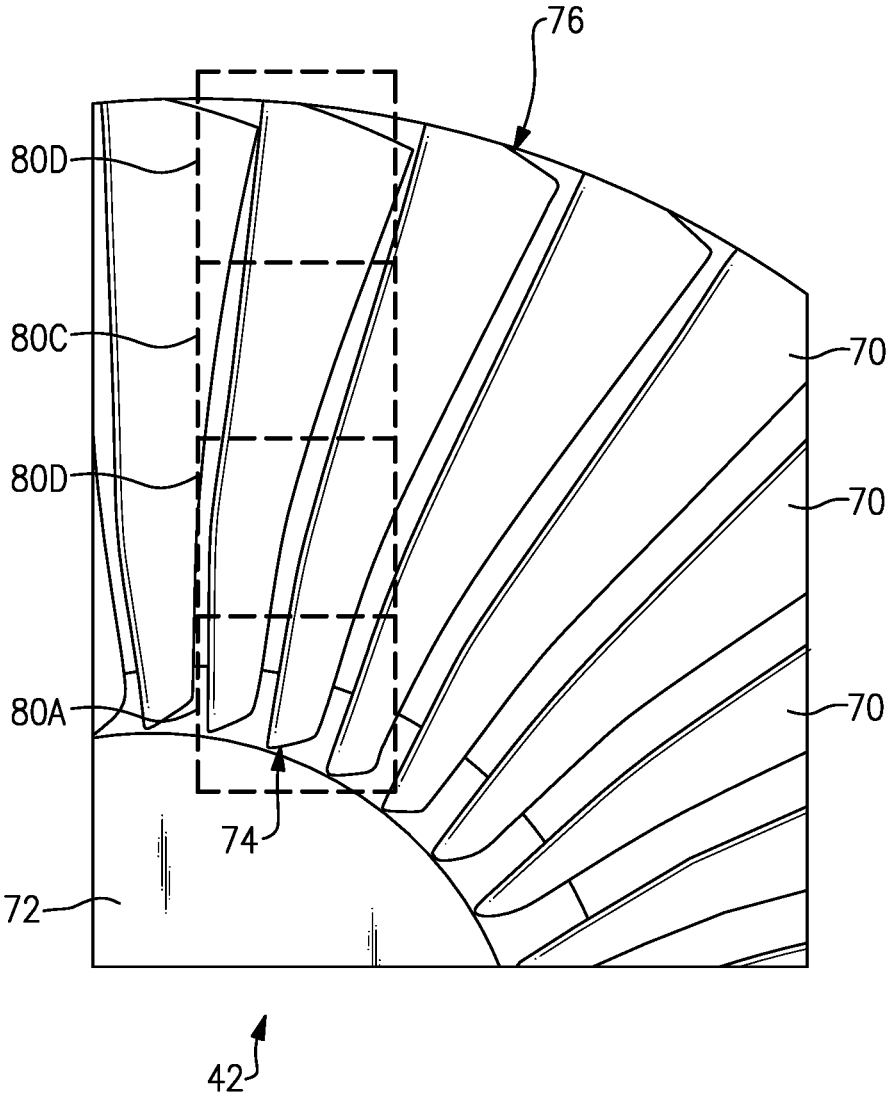
FIG. 3 is another schematic view of the nacelle and fan of FIG. 1.

FIG. 3 is another schematic view of the nacelle 15 and fan 42 of FIG. 1 in which each of the cameras 78 is configured to record photographic images of different regions 80A-D of the fan blades 70, with region 80A being a root region, and region 80D being a tip region disposed radially outward of the root region 80A, and regions 80B-C being disposed therebetween. In one or more embodiments, the regions 80A-D are overlapping regions. Although four cameras 78 and four regions 80A-D are shown, it is understood that these are non-limiting examples, and that more or fewer cameras (e.g., 1 cameras) and regions could be used.

Reference numeral 70 is generically used to refer to a fan blade herein, and as used herein a fan blade 70 can differ from the ones shown in FIG. 2.

Figure 4:
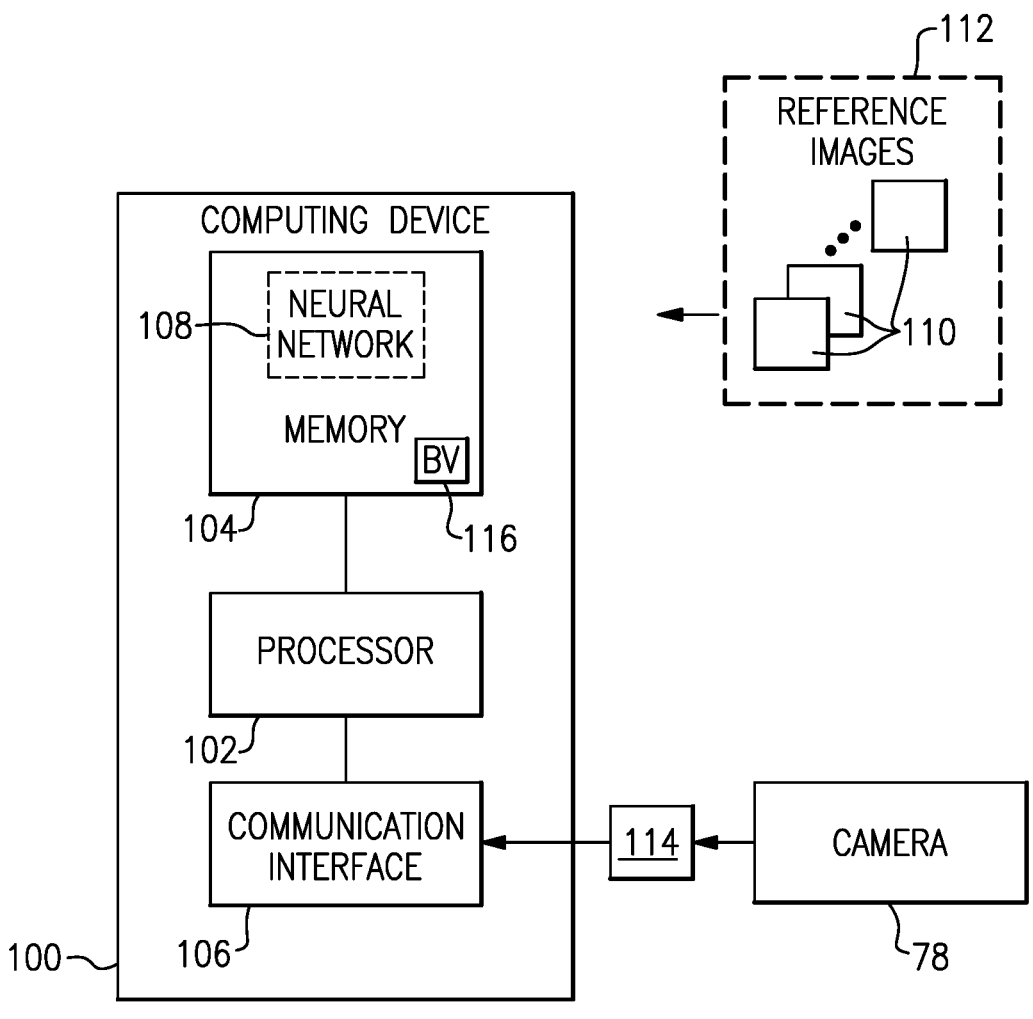
FIG. 4 is a schematic view of an example computing device configured to inspect fan blades of a gas turbine engine for abnormalities.

FIG. 4 is a schematic view of an example computing device 100 configured to use one or more of the image analytics techniques discussed below to inspect fan blades 70 of the gas turbine engine 20 for abnormalities (e.g., damage). In one or more embodiments, the computing device 100 is part of a FADEC of an aircraft.

The computing device 100 includes a processor 102 operatively connected to memory 104 and a communication interface 106. The processor 102 includes processing circuitry, such as one or more microprocessors, microcontrollers, application specific integrated circuits (ASICs), or the like, for example.

The memory 104 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 104 may incorporate electronic, magnetic, optical, and/or other types of storage media. The memory 104 can also have a distributed architecture, where various components are situated remotely from one another, but can be accessed by the processor 102.

The communication interface 106 is configured to facilitate communication between the computing device 100 and other devices, such as one or more cameras 78. Although only a single camera 78 is shown in FIG. 4, it is understood that multiple cameras could be utilized (e.g., as discussed above in connection with FIGS. 2-3).

In one or more embodiments, the camera 78 is a high speed camera with a shutter speed on the order of 4 microseconds, which facilitates recording photographic images of fan blades 70 during operation (e.g., flight) of the gas turbine engine 20 with no, or limited, blurring. It is understood that this is a non-limiting example, and that other cameras with different (e.g., slower) shutter speeds could be used instead.

In one or more embodiments, the memory 104 includes a neural network 108 (e.g., a deep region-based convolutional neural network or "RCNN") that has been trained with a plurality of first images 110 of fan blades 70 for one or more first gas turbine engines 20 (e.g., on the order of thousands of images 110). The first images 110 serve as reference images, and form a set 112. In one or more neural network embodiments (as discussed in connection with FIG. 5 below), the set 112 of first images 110 is used as training data for the neural network 108. In one or more embodiments (as discussed in connection with FIG. 6 below), the set 112 of first images 110 have initial dimensions, and are used to obtain a set 116 of basis vectors that represent the set 112 of first photographic images 110 in a reduced dimensional space that is reduced with respect to the initial dimensions and is represented by a set 116 of basis vectors.

Figure 5:
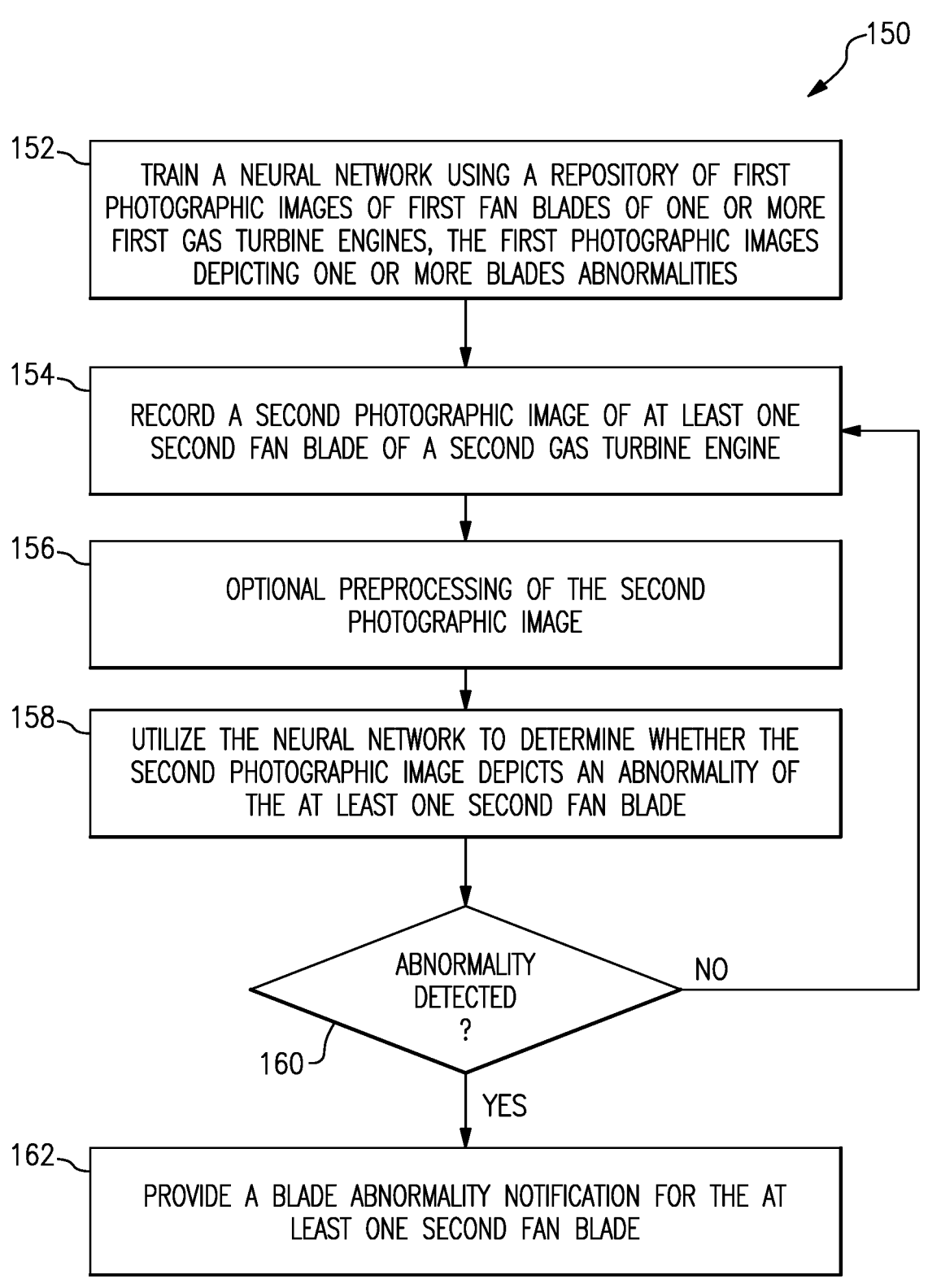
FIG. 5 is a flowchart of an example method of inspecting fan blades of a gas turbine engine for abnormalities.
Figure 6:
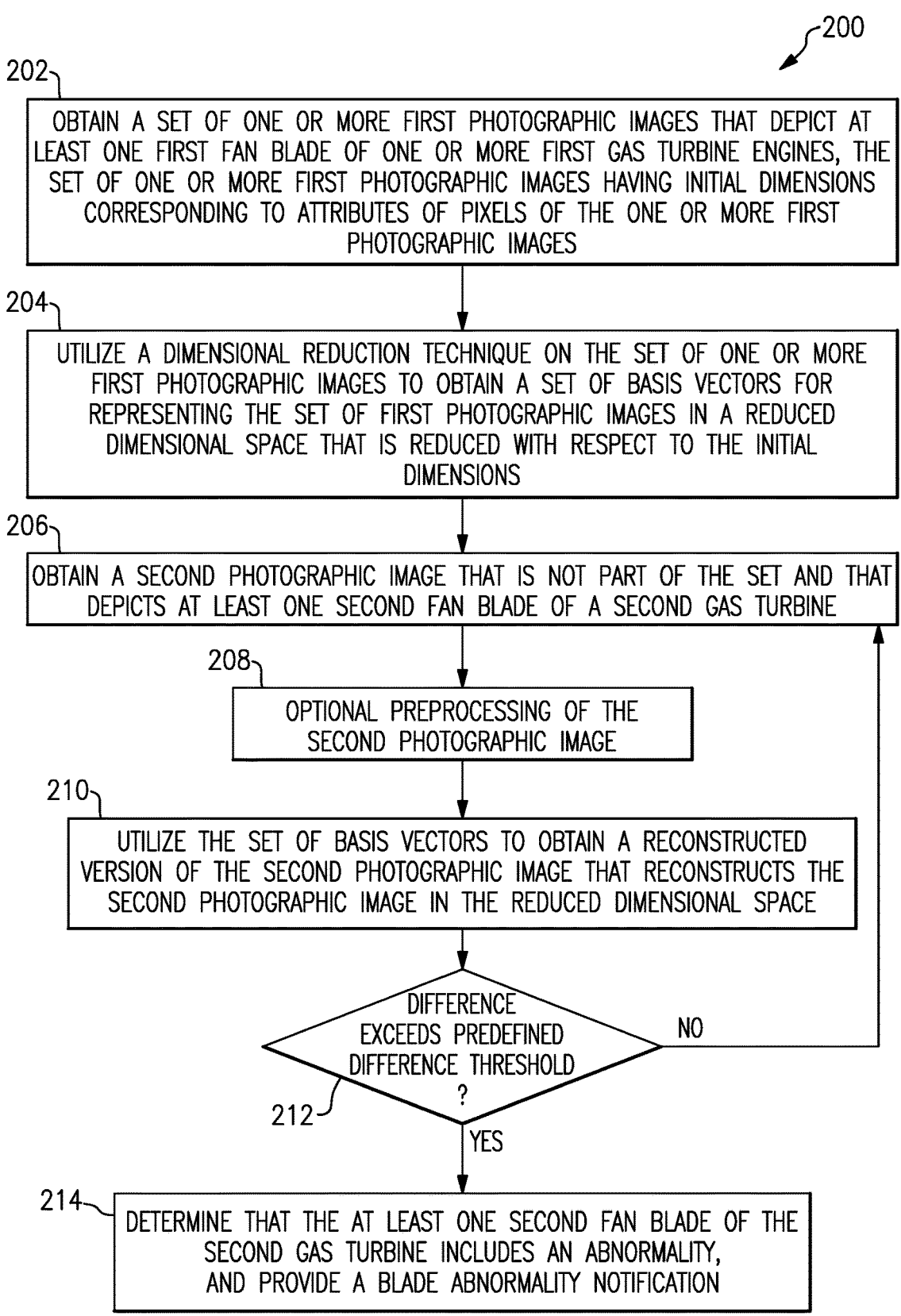
FIG. 6 is a flowchart of another example method of inspecting fan blades of a gas turbine engine for abnormalities.

FIGS. 5-7 describe methods 150, 200, 300 that utilize image analytics to detect fan blade abnormalities, such as dings and scratches from use, or cracks and breaks developed from usage or from collisions with ingested foreign object debris (FOD) or even other parts broken off from other engine components. All such damage shows up as abnormal features on the photographic images of these fan blades. By using modern image analytics techniques, as discussed herein, the defects can be identified but without having to compare the photographic images to a blueprint or computer model renderings of fan blades.

FIG. 5 is a flowchart of an example method 150 of inspecting fan blades of a gas turbine engine 20 for abnormalities utilizing the neural network 108. The neural network 108 is trained using a repository of first photographic images 110 (e.g., the set 112 in FIG. 4) of first fan blades 70 of one or more first gas turbine engines 20 (step 152), with the first photographic images depicting one or more fan blade abnormalities. A second photographic image 114 is recorded of at least one second fan blade 70 of a second gas turbine engine (step 154). Optionally, the second photographic image may be preprocessed (step 156), which is discussed in further detail below. The second gas turbine engine 20 may be one of the first gas turbine engines 20 mentioned in step 152, or maybe separate from the first gas turbine engines 20. Similarly, the second fan blade may be one of the first fan blades or may be separate from the first fan blades.

The neural network 108 is utilized to determine whether the second photographic image 114 depicts an abnormality of the at least one second fan blade 70 (step 158). The utilization may be used to extract encoded image features, and based on the encodings determine a bounding box, abnormality type, and shape contours of the abnormality, for example. Based on a determination that the second photographic image depicts an abnormality (a "yes" to step 160), a blade abnormality notification is provided for the at least one second fan blade 70 (step 162). The blade abnormality indication may include logging the detected abnormality detection in the memory 104, and/or providing a visible and/or audible notification (e.g., to a pilot of an aircraft that uses the gas turbine engine 20 through a maintenance flag), for example.

Based on step 158 resulting in no detection of an abnormality in the second photographic image 114 (a "no" to step 160), steps 154-162 are repeated for additional second photographic images of fan blades.

In one or more embodiments, to make the analysis more robust, portions of at least one of the first photographic images 110 are modified, and the training of the neural network 108 is performed using an augmented repository of the first photographic images 110 that includes the modified portions. The portions may correspond go "patches" which represent areas, which may be overlapping areas, of the images 110. Any one or combination of the following techniques may be used for the image modifications, for example: scaling, cropping, rotating, gamma correction, contrast adjustment, adding blurring, shearing, color channel adjustments, adding noise, perspective transformation, sharpening, and utilizing dropout regions (i.e., removing certain pixels from an image, either at random or with heuristics).

To elaborate on "utilizing dropout regions," in the context of a fan blade this may refer to removing some regions of pixels either at random or with heuristics, such that the learning (or inference) can avoid naively picking up visual cues from those particular regions in an attempt to minimize overfitting. This is similar to robustification via addition of noise (pixels are independent), but at a larger regional level (neighboring pixels are correlated). Consider an example of a picture of fan blade with lots of visual clutter in the background. "Dropping out" of the clutter regions may be performed randomly and/or heuristically so that the model would be less sensitive to these distractions. Indeed, there may be a chance where the dropped-out regions coincide with the actual defects, but since defects are relatively more rare (and also since training and inference takes in a collection of augmented images as a way of increasing robustness, e.g., via ensembling/averaging/voting), it is not expected to impede learning or inference.

The use of blurring augmentation of the first images 110 in the method 150 shown in FIG. 6 (and the other methods discussed below in FIGS. 6-7) in or more embodiments is particularly useful in making the neural network 108 more robust, as the use of blurred images in training data can make it easier for the neural network 108 to detect abnormalities in the second image 114, which may be recorded of a fan blade rotating at high speeds (e.g., on the order of hundreds of RPM), and therefore may include some blurring. Thus, in one or more embodiments, the second photographic image includes blurring that depicts rotation of the at least one second fan blade, and at least one of the first photographic images includes blurring that depicts rotation of the one or more first fan blades.

The use of augmentation, such as image rotation, may be useful to prevent the neural network 108 from learning only a limited number of crack orientations, for example.

Referring again to step 156, the optional preprocessing of the second photographic image 114 may include noise removal, contrast adjustment (which may include lighting adjustments), and/or sharpening to make the photographic image 114 more suitable for analysis.

In one or more embodiments, the preprocessing of step 156 also includes performing augmentation as described above (e.g., scaling, cropping, rotating, gamma correction, and adding blurring). If such augmentation was used in step 156, the method 150 could be performed using multiple versions of the second photographic image 114. If a conclusion of a blade abnormality was reached for multiple versions of the second photographic image 114, that could be used to increase confidence in the abnormality detection.

As discussed above, the method 150 (and the other methods 200 and 300 discussed herein) can be performed without requiring comparison to a blueprint or computer model renderings of fan blades, which has traditionally been required of prior art techniques.

The neural network 108 is designed to extract regions within the second photographic image 114 that are likely objects of interest. To do this, large amounts of training data are used (e.g., on the order of tens of thousands of images 110) of all kinds of objects (e.g., not limited to damage sites on airfoil fan blades, but non-damaged sites, or other parts of the fan blades that can be found in the footages), to train inner layers of the neural network 108 to recognize objects within the reference images 110.

In one or more embodiments, the training performed in step 152 is supervised training, in which the first images 110 are labeled to indicate abnormality (e.g., damage) sites, for the neural network 108 to learn specific features. In one or more different embodiments, the neural network 108 includes an autoencoder, and the training performed in step 152 is unsupervised training that does not require labeling of abnormality (e.g., damage) sites.

In one or more embodiments, the neural network 108 is a deep convolution neural network with a prominent restricted inner layer trained on a set of images. The images 110 used in the training may be segmented into smaller patches. These patches can be used as is or with many added images augmentations/modifications added (as discussed above) such as noise, rotation, changes in lighting, motion induced blurring etc. to enrich the informational content. The central restriction or "bottle neck layer" in the neural network forces a reduction in the details learned by the network. The difference of the reproduction (using the trained network and basis vectors that are discussed below) and the original footages points to the abnormal features i.e., damages. The reconstruction is expected to look like a blade without defects, but not a perfect reproduction. Hence, when one compares the imperfect reproduction to the observation (with defects), there will be a difference in defect regions representing "errors", and quantifying those errors yields a "reconstruction error", which is the basis for determining whether a defect is present in that region.

FIG. 6 is a flowchart of an example method 200 of inspecting fan blades of a gas turbine engine 20 for abnormalities, where the method uses a statistical dimensional reduction technique, such as Principal Component Analysis (PCA) (e.g., a PCA-based autoencoder). However, it is understood that other statistical dimensional reduction techniques could be used, such as Independent Component Analysis (ICA) or Zero-Phase Component Analysis (ZCA), for example. Unlike the method 150, no training is required to perform the method 200.

The set 112 of one or more first photographic images 110 that depict at least one first fan blade 70 of one or more first gas turbine engines 20 is obtained (step 202). The set 112 of one or more first photographic images has initial dimensions corresponding to attributes of pixels of the one or more first photographic images (e.g., x-axis coordinate, y-axis coordinate, color intensity for red, green, and blue, alpha channels, etc.). In one or more embodiments, the initial dimensionality is on the order of thousands or tens of thousands for a the set 112 of reference images 110. Initially, an image patch may have a dimensionality of over one thousand (e.g., 32 pixels tall, 32 pixels wide, 3 RGB channels, which corresponds to 3,072 dimensions), and there are generally numerous patches in an image. The dimensionality may increase further if other information is included (e.g., alpha channels, hue saturation, etc.).

A dimensional reduction technique (e.g., PCA) is utilized on the set 112 of one or more first photographic images 110 to obtain a set 116 of basis vectors for representing the set 112 of first photographic images 110 in a reduced dimensional space that is reduced with respect to the initial dimensions (step 204). A second photographic image 114 is obtained that is not part of the set 112 and that depicts at least one second fan blade 70 of a second gas turbine 20 (step 206). Optionally, the second photographic image may be preprocessed (step 208) in a similar manner to the preprocessing described in step 156 in FIG. 6.

The set 116 of basis vectors is utilized to obtain a reconstructed version of the second photographic image 114 by reconstructing the second photographic image 114 in the reduced dimensional space (step 210), which imposes a restriction on the information content of the photographic image 114. A comparison between the second photographic image 114 and the reconstructed version of the second photographic image 114 is performed to determine a difference (e.g., an error) between the second photographic image 114 and its reconstruction (step 212).

Based on the difference exceeding a predefined difference threshold (a "yes" to step 212), a determination is made that the at least one second fan blade of the second gas turbine includes an abnormality, and a blade abnormality notification is provided (step 214). Based on the error not exceeding the predefined difference threshold (a "no" to step 212), a different second photographic image 114 is obtained and steps 2016-214 are repeated. The blade abnormality indication may include logging the detected abnormality detection in the memory 104, and/or providing a visible and/or audible notification (e.g., to a pilot of an aircraft that uses the gas turbine engine 20), for example.

The comparison of the difference to the difference threshold in step 212 can be performed at the pixel or patch level, for example. In one or more embodiments, the comparison of the "difference" to the difference threshold in step 212 is done at a pixel level, is then aggregated locally (e.g., determining if the difference for a region exceeds the threshold), and then the defect can be localized and its location identified. In one or more other embodiments, the difference comparison of step 212 is performed at a "patch" level, in which case if the aggregate error exceeds some threshold, then we know that a defect exists in the patch, but not necessarily where. However, if the "patch" is sufficiently small (e.g., derived from a larger image), then the ability to localize it becomes more fine.

Here too, the second gas turbine engine 20 referenced in step 206 may be one of the first gas turbine engines 20 mentioned in step 202, or maybe separate from the first gas turbine engines 20. Similarly, the second fan blade of step 206 may be one of the first fan blades referenced in step 202 or may be separate from the first fan blades. In one or more embodiments, none of the images 110 in the set 112 of reference images includes the abnormality.

In one or more embodiments, prior to utilizing the dimensional reduction technique in step 204, the one or more first images 110 are divided into a plurality of patches that represent areas of the one of more first images, and step 204 includes utilizing the dimensional reduction technique on the plurality of patches, and the basis vectors in the set 116 correspond to features common to all of the patches from the one or more first photographic images 110.

The dividing of the one or more first images 110 into patches may be performed in a similar manner that the images 110 are divided for the method 150, except no machine learning-based training is required.

The partitioned patches can be supplemented with augmented images, for example, rotation of the patches or addition of motion induced blurring, and modification of lighting conditions.

In one or more embodiments, to make the abnormality detection of the flowchart 200 more robust, portions of at least one of the first photographic images 110 are modified, and the utilization of the dimensional reduction technique on the set 112 of one or more first images 110 in step 204 is performed on an augmented set 112 of the first photographic images 110 that includes the modified portions.

Here too, any one or combination of the following techniques may be used for the image modifications: scaling, cropping, rotating, gamma correction, and contrast adjustment, and adding blurring.

In one or more embodiments, the modification includes modifying a brightness of the portions of the one or more first photographic images 110 to simulate lighting conditions that differ from those of the at least one of the one or more first photographic images 110.

The dimension of the PCA reproduction is restricted by a reduction in the dimensionality of the PCA model. This dimensionality is determined by the PCA analysis itself using an analysis of the information content in the PCA space, or information content which tells if such a dimensionality reduction exists and if so, what is the value. Above, an example was discussed where an image patch would have a dimensionality of 3,072 dimensions. For some patches of images of a fan blade or a part thereof, it was found that in some examples a dimensionality on the order of 3,072 dimensions for a patch could be reduced to about 20 dimensions (the effective PCA dimension). The difference of the original image patches and their reproduction with this low dimensional reproduction method (as analyzed in step 212) points at the existence of an abnormal feature in a particular image patch i.e., a damage detection.

The method 200 is very computationally efficient, and in one or more embodiments involves only standard linear algebra operations and can therefore readily fit into the existing onboard computing hardware of an aircraft, and thus can be carried out in-situ on the engine controller (e.g., a FADEC). As discussed above in connection with step 214, The results may then be logged, and/or flags may be issued to indicate damage detections, for example.

FIG. 7 is a flowchart of an example method 300 of inspecting fan blades of a gas turbine engine for abnormalities that analyzes adjacent/connected image subsets detections and interrogation of their geometric characteristics. Unlike the other examples discussed above, this method does not require the use of reference photographic images 110.

A photographic image 114 of a fan blade of a gas turbine engine 20 is obtained (step 302). Optionally, the photographic image 114 may be preprocessed (as discussed above in connection with steps 156 and 208). Contrast differences between adjacent areas of the fan blade in the photographic image 114 are determined (step 306).

Based on the contrast between two adjacent areas of the image exceeding a predefined contrast threshold (a "yes" to step 308), and further based on a geometry of whichever of the two adjacent areas has a lower pixel count fulfilling one or more geometric criteria (a "yes" to step 310), a determination is made that the fan blade includes an abnormality, and a blade abnormality notification is provided or the fan blade (step 312). The blade abnormality indication may include logging the detected abnormality detection in the memory 104, and/or providing a visible and/or audible notification (e.g., to a pilot of an aircraft that uses the gas turbine engine 20 through a maintenance flag), for example.

If the contrast difference does not exceed the threshold (a "no" to step 308) or if the one or more geometric criteria are not met (a "no" to 310), then no abnormality is detected, and the method 300 can be repeated for another image of a fan blade 70 of the gas turbine engine 20.

The method 300 uses contrast (e.g., local contrast) in the image 114 to detect subsets in an image which represent possible abnormalities (e.g., damaged locations). For example, if there is a large change of contrast over a short distance, then that may represent a part, but if there is a large change in contrast over a large distance, that could just be a change in lighting of a scene. As described above, the subsets meeting the contrast criteria (a "yes" to step 308) are interrogated in step 310 by evaluating one or more associated geometric parameters such as the area, perimeter, characteristic dimensions, shape, etc. From these parameters, those that are associated with blade abnormality (e.g., damage, such as a ding, a crack, or scratch) can be determined. Performance of the method 300 relies on tuning with a set of photographic images, using standard optimization methods. The method 300 does not require any training like neural networks, and is very computationally efficient, having a low memory requirement, and may be carried out in-situ on the engine controller (e.g., a FADEC).

The reference above to "whichever of the two adjacent areas has a lower pixel count" may be used to distinguish between a potentially damaged area of a fan blade 70 (which is likely to be relatively small) and a non-damaged area of a fan blade 70 (which is likely to be relatively large in comparison to the potentially damaged area). By assuming that the non-damaged area of the fan blade 70 will be larger, the geometric criteria can focus on the potentially damaged area, to see if the potentially damaged area is something negligible (e.g., a scratch from blade polishing, or a bad pixel from the camera 78), or potentially represents damage such as a crack, dent, etc.

As discussed above, a variety of different geometric criteria could be used, such as any one or combination of the following:

a minimum width that must be exhibited by said whichever of the two adjacent areas has a lower pixel count in order to represent a particular type of abnormality;

a minimum area that must be included in said whichever of the two adjacent areas has a lower pixel count in order to represent a particular type of abnormality;

a minimum number of pixels that must be included in said whichever of the two adjacent areas has a lower pixel count in order to represent a particular type of abnormality;

a shape criterion describing a geometry of a shape representing a particular type of abnormality (e.g., a shape it is a circular blob, a long segment, some small islands, the size of detection, etc.);

a boundary criterion describing a boundary representing a particular type of abnormality (e.g., circumference and/or or perimeter length of the defect, perimetric complexity and/or circularity, etc.); and a requirement that a boundary of said whichever of the two adjacent areas has a lower pixel be contiguous in order to represent a particular type of abnormality (e.g., "connected component analysis" or "connected component labeling" (CCL) in computer vision terms, which refers to analysis of connected components to detect connected regions in digital images).

The minimum width criterion may be used to determine if the potentially abnormal area is large enough to represent a crack, for example.

The minimum area and/or minimum number of pixel criteria may be used to determine if the potentially abnormal area is large enough to represent a ding or crack, for example.

The shape and/or boundary criteria may be used to determine if the potentially abnormal area has a shape and/or boundary that could indicate certain types of damage (e.g., a dent).

Unlike prior art techniques, none of the methods 150, 200, 300 require any reference to blueprints or computer model renderings of fan blades, and do not require human inspectors to review footage in the analysis stage (i.e., steps 158-162 of FIG. 5, steps 210-214 of FIG. 6, and steps 306-312 of FIG. 7).

In one or more embodiments, the methods 200 and/or 300, being less computationally complex than the method 150, are performed on board of an aircraft that includes the gas turbine engine 20.

As discussed above, in the prior art, prior art fan blade inspection methods have generally been performed via routine maintenance and inspection and/or using comparison to computer models of the fan blades for detecting abnormalities, which is cumbersome. Detection of damages by comparing images obtained in the field (e.g., from onboard cameras) to the designed specifications (e.g., from a blueprint) is not reliable and is also very difficult to implement due to the wide variability of the camera settings and lighting conditions. Such methods are also prone to negative effects of the noisy and vibratory environment in an operating engine unless the images are taken when the engine is not running, and camera settings and lighting are very precisely controlled. To the extent automation ha been used (e.g., borescope automation), such automation is not reliable and not cost effective.

A better and unique way is to use the modern image analytics methods 150, 200, and/or 300 discussed herein to detect such abnormalities. The models work on the images from the field, and even more conveniently, in some embodiments images taken in-situ with high speed cameras. The methods 150, 200, and/or 300 do not require tracking a particular fan blade over time, and also do not require historical images of any particular fan blade in order to detect an abnormality in the fan blade. The detected abnormal features can be recorded to assess the degradation of these airfoils with use or to issue warning flags to induce inspection and maintenance recommendations.

With the advent of miniature high speed digital cameras, it is now feasible to take photographs of these fan blades in regions where the camera can survive the harsh environment within an operating engine to continuously monitor the health of these airfoils. It is, however, not feasible, or is excessively expensive to have humans to go through such images to identify abnormalities (e.g., damage) on the airfoils. As discussed above, the methods 150, 200, 300 can avoid such human inspection.

Although a gas turbine engine is discussed above, it is understood that this is a non-limiting example, and that methods 150, 200, and/or 300 could be utilized for other types of engines, and is not limited to geared turbofan gas turbine engines 20.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of inspecting fan blades of a gas turbine engine for abnormalities, comprising:

obtaining, by one or more processors of a computing device, a set of one or more first photographic images that depict at least one first fan blade of one or more first gas turbine engines, the set of one or more first photographic images having initial dimensions corresponding to attributes of pixels of the one or more first photographic images, and the computing device comprising at least the one or more processors, a memory element, and a communication interface;

utilizing, by the one or more processors, a dimensional reduction technique on the set of one or more first photographic images to obtain a set of basis vectors for representing the set of first photographic images in a reduced dimensional space that is reduced with respect to the initial dimensions, wherein the dimensional reduction technique is Principal Component Analysis (PCA);

obtaining, by the one or more processors from at least one camera, a second photographic image that is not part of the set and that depicts at least one second fan blade of a second gas turbine engine, the at least one camera being situated within a nacelle of the second gas turbine engine, and the one or more processors being communicatively coupled to the at least one camera via a communication interface of the computing device;

utilizing the set of basis vectors to obtain a reconstructed version of the second photographic image that reconstructs the second photographic image in the reduced dimensional space;

based on a difference between the second photographic image and the reconstructed version of the second photographic image exceeding a predefined difference threshold, determining, by the one or more processors, that the at least one second fan blade of the second gas turbine includes an abnormality and providing a blade abnormality notification, by the one or more processors, the blade abnormality notification comprising at least one of: logging the abnormality in the memory element, providing a visible notification, and providing an audible notification.

2. The method of claim 1, comprising, prior to said utilizing a dimensional reduction technique to obtain the set of basis vectors:

dividing at least one of the one or more first photographic images in the set into a plurality of patches that represent areas of the one of more first images;

wherein said utilizing the dimensional reduction technique on the set of one or more first photographic images comprises utilizing the dimensional reduction technique on the plurality of patches; and wherein the basis vectors correspond to features common to all of the patches from the one or more first photographic images.

3. The method of claim 1, comprising:

modifying portions of at least one of the one or more first photographic images by using one or more of the following techniques: scaling, cropping, rotating, gamma correction, and contrast adjustment; and wherein said utilizing a dimensional reduction technique on the set of one or more first images is performed on an augmented set of the first photographic images that includes the modified portions.

4. The method of claim 1, comprising:

modifying portions of at least one of the one or more first photographic images by adding blurring to said portions; and wherein said utilizing a dimensional reduction technique on the set of one or more first images is performed on an augmented set of the first photographic images that includes the modified portions.

5. The method of claim 1, comprising:

modifying portions of at least one of the one or more first photographic images by modifying a brightness of said portions to simulate lighting conditions that differ from those of said at least one of the one or more first photographic images; and wherein said utilizing a dimensional reduction technique on the set of one or more first images is performed on an augmented set of the first photographic images that includes the modified portions.

6. The method of claim 1, wherein none of said one or more first photographic images includes the abnormality.

* * * * *